United States Patent
Huckaby et al.

(10) Patent No.: US 6,847,911 B2
(45) Date of Patent: Jan. 25, 2005

(54) METHOD AND APPARATUS FOR TEMPERATURE THROTTLING THE ACCESS FREQUENCY OF AN INTEGRATED CIRCUIT

(75) Inventors: Jennifer Faye Huckaby, Raleigh, NC (US); Torsten Partsch, Chapel Hill, NC (US); Johnathan Edmonds, Cary, NC (US)

(73) Assignee: Infineon Technologies AG, Munich (DE)

(*) Notice: Subject to any disclaimer, the term of this patent is extended or adjusted under 35 U.S.C. 154(b) by 211 days.

(21) Appl. No.: 10/210,962

(22) Filed: Aug. 2, 2002

(65) Prior Publication Data

US 2004/0024561 A1 Feb. 5, 2004

(51) Int. Cl.⁷ .................................................. G01K 1/00
(52) U.S. Cl. ........................ 702/130; 702/132; 713/300; 713/322
(58) Field of Search .............................. 702/130, 132; 713/300, 322

(56) References Cited

U.S. PATENT DOCUMENTS 5,940,785 A * 8/1999 Georgiou et al. ........... 702/132

* cited by examiner

*Primary Examiner*—Kamini Shah
*Assistant Examiner*—Stephen J. Cherry
(74) *Attorney, Agent, or Firm*—Thomas R. FitzGerald, Esq.; Laurence S. Roach, Esq.

(57) ABSTRACT

A method of throttling the frequency with which an integrated circuit is accessed includes sensing the temperature of the integrated circuit die and converting the sensed temperature to a digital signal. The digital signal is stored in a register of the integrated circuit. The digital signal is read, and the frequency with which the integrated circuit is accessed is adjusted dependent at least in part upon the temperature of the die as indicated by the digital signal.

21 Claims, 2 Drawing Sheets

METHOD AND APPARATUS FOR TEMPERATURE THROTTLING THE ACCESS FREQUENCY OF AN INTEGRATED CIRCUIT

FIELD OF THE INVENTION

The present invention relates generally to integrated circuits (ICs). More particularly, the present invention relates to a method and apparatus for throttling the frequency with which an IC is accessed dependent at least in part upon the die temperature of the IC.

BACKGROUND OF THE INVENTION

The frequency with which an IC, such as, for example, a memory chip, can be accessed is usually an important factor in the overall performance of the system within which that IC is used. Generally, as the speed with which the IC is accessed increases the overall system performance will also increase. Thus, it is desirable to access an IC at or near its highest or maximum access frequency to thereby increase the overall performance of the system within which the IC is being used.

However, as the frequency with which the IC is accessed increases, the power consumed by and, thus, the heat generated by the IC also increases. At least some of the power consumed by the operation of the IC is transferred in the form of heat to the IC die. Thus, in general, as the frequency with which the IC is accessed increases so to does the temperature of the IC die. If the temperature of the die exceeds a recommended and/or maximum threshold, temperature viruses (e.g., data corruption) and/or chip failure may result. To avoid such a condition, IC manufacturers recommend that the IC be operated at a predetermined maximum access frequency. The predetermined maximum access frequency is typically conservative, and is based upon worst-case operating conditions, such as, for example, an ambient temperature and/or a die temperature at or near the respective rated maximums. Because the maximum access frequency rating is based upon such worst case conditions, it may be possible to access the IC at a frequency in excess of the maximum frequency rating when the IC is operating under typical, i.e., less than worst case, conditions. Additionally, when the die temperature is at or approaching the rated maximum it may be necessary to access the IC at frequencies below the maximum access frequency to ensure the IC is consuming less power and thereby enable the die to "cool off".

Therefore, what is needed in the art is a method and apparatus that adjusts the frequency with which an IC is accessed based upon the die temperature of the IC.

Furthermore, what is needed in the art is a method and apparatus that enables an IC to be accessed with a higher frequency when the die temperature is below a predetermined maximum.

Moreover, what is needed in the art is a method and apparatus that enables an IC to be accessed with a lower frequency when the die temperature is at or approaching a predetermined maximum.

SUMMARY OF THE INVENTION

The present invention provides a method and apparatus for throttling the frequency with which an integrated circuit is accessed.
The invention comprises, in one form thereof, a method of throttling the frequency with which an integrated circuit is accessed including the steps of sensing the temperature of the integrated circuit die and converting the sensed temperature to a digital signal. The digital signal is stored in a register of the integrated circuit. The digital signal is read, and the frequency with which the integrated circuit is accessed is adjusted dependent at least in part upon the temperature of the die as indicated by the digital signal.

An advantage of the present invention is that the frequency with which the IC is accessed is throttled dependent upon the die temperature of the IC.

Another advantage of the present invention is that the IC is accessed with a higher frequency when the die temperature is below a predetermined operating threshold.

Yet another advantage of the present invention is that the IC is accessed at a lower frequency when the die temperature is at or approaching a predetermined maximum threshold.

BRIEF DESCRIPTION OF THE DRAWINGS

The above-mentioned and other features and advantages of this invention, and the manner of attaining them, will become appreciated and be more readily understood by reference to the following detailed description of one embodiment of the invention in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE DRAWINGS

Figure 1:
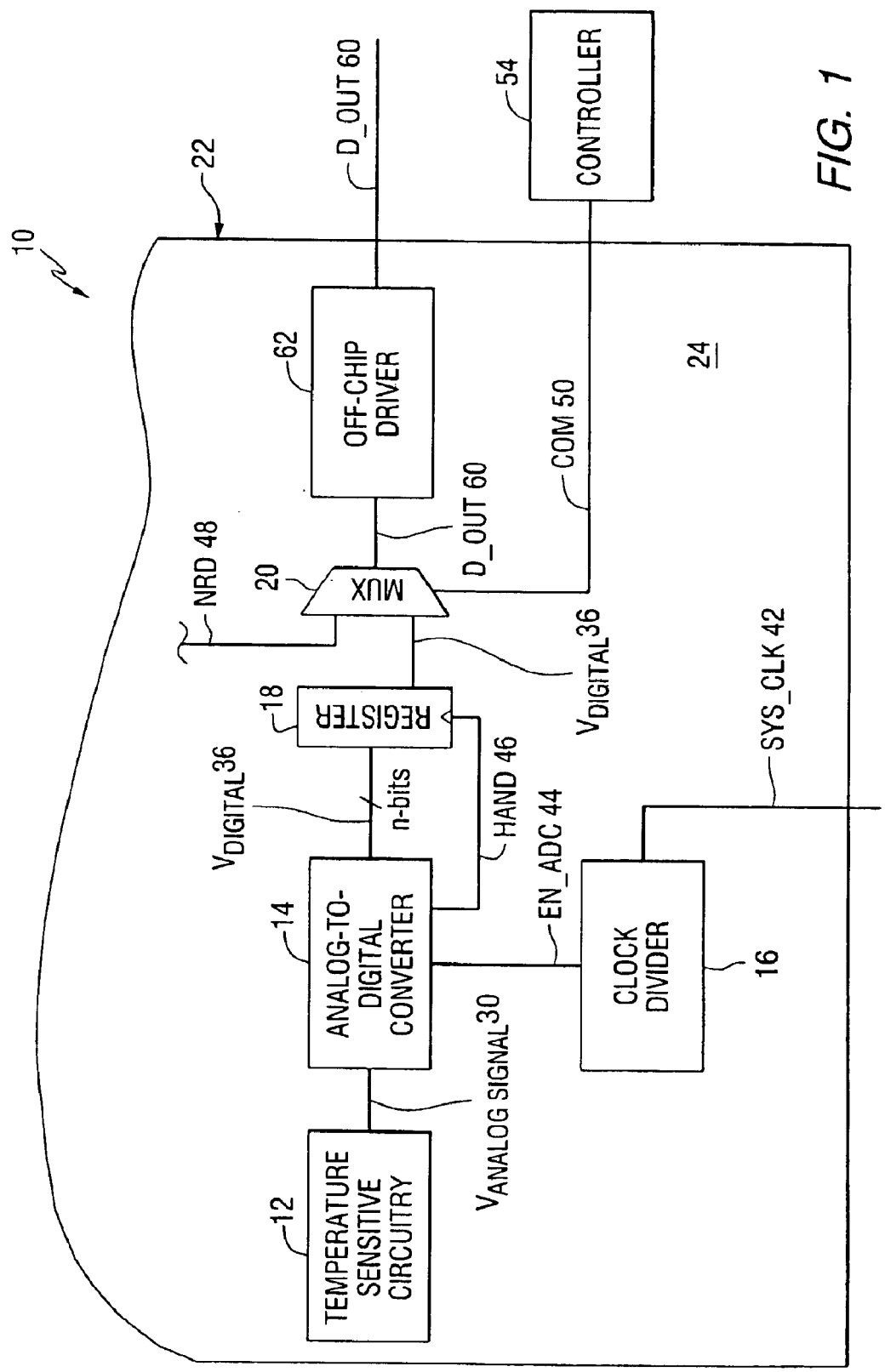
FIG. 1 is a block diagram of one embodiment of an on-chip temperature sensor apparatus of the present invention.

Referring now to the drawings, FIG. 1 shows one embodiment of an apparatus for temperature throttling the access frequency of an integrated circuit of the present invention. Temperature throttling device (TTD) 10 includes temperature sensitive circuitry (TSC) 12, analog-to-digital converter (ADC) 14, clock divider 16, register 18 and multiplexer (MUX) 20. Generally, TTD 10 throttles the frequency with which IC 22 is accessed dependent at least in part upon the temperature of die 24 from which IC 22 is fabricated, to thereby enable IC 22 to be accessed at the highest frequency while maintaining the temperature of die 24 below a predetermined maximum threshold.

Figure 2:
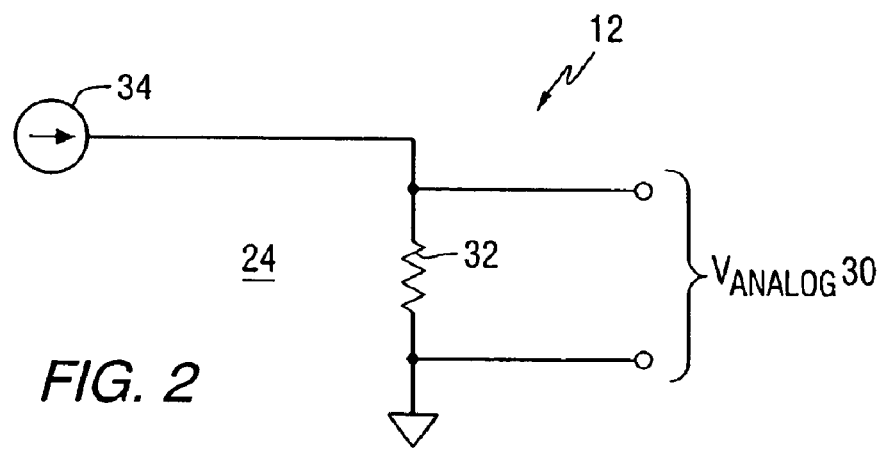
FIG. 2 is an exemplary embodiment of the temperature measuring circuitry of FIG. 1.

Temperature sensitive circuitry (TSC) 12 is generally known in the art. Generally, TSC 12 provides an analog output voltage signal ($V_{ANALOG}$) 30 that is indicative of the temperature of die 24. An exemplary embodiment of TSC 12 is shown in FIG. 2. TSC 12 includes temperature sensitive element (TSE) 32, such as, for example, a resistor, and current source 34. TSE 32 is electrically connected between current source 34 and ground potential. TSE 32 is formed integrally with die 24, and has a precise value of conductance or resistance that is dependent upon the temperature of die 24. Thus, as the temperature of die 24 changes the voltage drop across TSE 32 and, thus, $V_{ANALOG}$ signal 30 change accordingly. Current source 34 is electrically connected to TSE 32. Current source 34 is a reference current source and supplies to TSE 32 an electrical current that is substantially constant and substantially invariable with respect to temperature. Current source 34 is formed integrally and monolithically with die 24. TSC 12 is electrically connected and supplies $V_{ANALOG}$ signal 30 to ADC 14.

ADC 14 is a conventional n-bit analog to digital converter, and converts $V_{ANALOG}$ signal 30 to an n-bit digital ($V_{DIGITAL}$) signal 36 equivalent thereto. The desired accuracy of the temperature measurement determines the bit size of $V_{DIGITAL}$ signal 36 and, thus, the number of bits of ADC 14. ADC 14 is electrically connected and supplies $V_{DIGITAL}$ signal 36 to register 18. ADC 14 is also integral and monolithic with die 24.

Clock divider 16 receives a system clock signal (SYS_CLK) 42 and divides SYS_CLK signal 42 by a factor of x, with x being determined by, for example, the thermal reaction time of IC 22 and/or the time interval in which temperature readings are desired. Clock divider 16 is electrically connected to ADC 14 and supplies enable signal (EN_ADC) 44 thereto. EN_ADC signal 44 is a clock signal similar to SYS CLK signal 42 but having a frequency of SYS_CLK signal 42 divided by x. Clock divider 16 is also integral and monolithic with die 24.

Register 18 is a conventional n-bit register. The number of bits n of register 18 corresponds to the number of bits n of ADC 14. Register 18 receives $V_{DIGITAL}$ signal 36 from ADC 14, and stores the digital value corresponding to the temperature of die 24 indicated thereby. Register 18 also receives handshake signal (HAND) 46 from ADC 14. Register 18 is electrically connected to MUX 20, and supplies thereto $V_{DIGITAL}$ signal 36 when enabled by HAND signal 46. Register 18 is integral and monolithic with die 24.

MUX 20, as stated above, is electrically connected to MUX 20 and receives therefrom $V_{DIGITAL}$ signal 36. MUX 20 also receives normal read data (NRD) signal 48 from the functional block or main circuitry (not shown) of IC 22, and command (COM) signal 50 from a controller 54 of the system within which IC 22 is used and which may be internal but is typically external to IC 22. MUX 20 issues data out (D_OUT) signal 60 to an output, such as, for example, one of the package pins, of IC 22 via off-chip driver circuit 62. MUX 20, dependent at least in part upon COM signal 50, selects which of NRD signal 48 and $V_{DIGITAL}$ signal 36 is issued as D_OUT signal 62. MUX 20 is integral and monolithic with die 24.

In use, TSC 12 converts the temperature of die 24 to an analog output signal ($V_{ANALOG}$) 30 that is indicative of the temperature of die 24. The analog output signal $V_{ANALOG}$ 30 is received by ADC 14, and converted thereby to a digital value of n-bits, such as, for example, sixteen bits. Clock divider 16 receives SYS_CLK signal 42, divides SYS_CLK signal 42 by a factor x, as described above, and issues EN_ADC 44 to thereby enable ADC 14 every x time units. Thus, the temperature of die 24 is read from TSC 12 in the form of $V_{ANALOG}$ signal 30 by ADC 14 every x time units. ADC 14 converts $V_{ANALOG}$ signal 30 to $V_{DIGITAL}$ signal 36 and issues handshake signal (HAND) 46 when the conversion of $V_{ANALOG}$ signal 30 to $V_{DIGITAL}$ signal 36 is complete. Register 18 receives HAND signal 46, and is enabled thereby to receive and store $V_{DIGITAL}$ signal 36. Register 18 stores $V_{DIGITAL}$ signal 36, and supplies $V_{DIGITAL}$ signal 36 to MUX 20. MUX 20, responsive to COM signal 50 selects either NRD signal 48 or $V_{DIGITAL}$ signal 36 to issue as data out signal 60 to OCD circuit 62. From OCD circuit 62, data out signal 60, and thus a digital representation of the temperature of die 24, is accessible by control circuit 54, such as, for example, a memory controller.

Control circuit 54 is configured to increase the frequency with which IC 22 is accessed until the temperature of die 24 reaches an operating or first predetermined threshold as indicated by $V_{DIGITAL}$ signal 36 in the form of data out signal 60. If the temperature of die 24 rises above a second or maximum predetermined threshold, which could be the same as or different from the first/operating threshold, control circuit 54 is configured to decrease the frequency with which IC 22 is accessed, at least until the temperature of die 24 drops below a third predetermined threshold that may be the same as or different than the first/operating and/or second/maximum predetermined thresholds. Thus, TTD 10 enables the access frequency of IC 22 to be throttled by control circuit 54 dependent at least in part upon the temperature of die 24. Thus, TTD 10 in conjunction with control circuit 54 enable the adjustment of the frequency with which IC 22 is accessed dependent at least in part upon periodic readings of the temperature of die 24 as indicated by data out signal 60.

Figure 3:
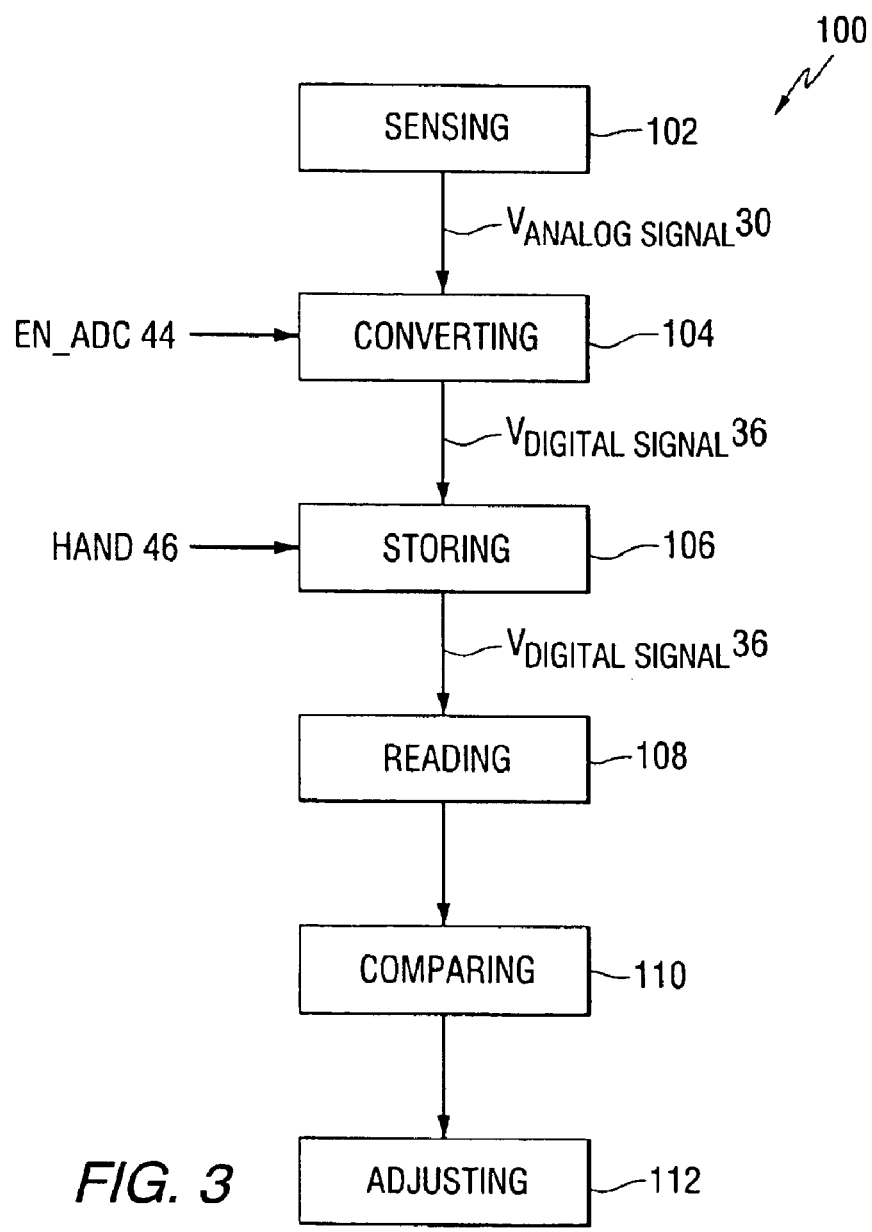
FIG. 3 is a flow diagram of the method of the present invention.

The above described method is shown in FIG. 3, which illustrates one embodiment of a method for throttling the frequency with which an IC is accessed dependent at least in part upon the die temperature of the IC. Method 100 includes the steps of sensing the die temperature (Sensing step 102), converting the sensed die temperature to a digital signal (Converting step 104), storing the digital signal (Storing step 106), reading the digital signal step (Reading step 108), comparing the digital signal against predetermined thresholds (Comparing step 110), and adjusting the frequency with which IC 22 is accessed step 112 (Adjusting step 112).

Sensing step 102 is accomplished by temperature sensitive circuitry, such as TSC 12, which issues an analog signal, such as $V_{ANALOG}$ 30, that is indicative of the temperature of die 24. Converting step 104 converts the analog signal to a digital signal, such as $V_{DIGITAL}$ signal 36, that is indicative of the temperature of die 24. Converting step 104 is performed periodically, dependent at least in part upon a periodic enable signal, such as EN_ADC 44 (i.e., the divided SYS_CLK signal 42). By converting the temperature to a digital signal periodically, rather than continuously, power consumption is reduced. Upon the completion of converting step 104, a signal, such as HAND signal 46, is issued that indicates the converting step 104 is complete. Thereafter, storing step 106 is executed to thereby load $V_{DIGITAL}$ signal 36 into storage, such as, for example, a memory or register of IC 22.

Storing step 106 includes the storing of $V_{DIGITAL}$ signal 36 in a register, such as register 18, of IC 22. Storing of $V_{DIGITAL}$ signal 36 in a register of IC 22 is performed periodically dependent at least in part upon an enable signal, such as HAND signal 46, that ensures the conversion from the analog to the digital domain, i.e., from $V_{ANALOG}$ 30 to $V_{DIGITAL}$ signal 36, has been completed and thus that only accurate temperature data is stored in the register. Using a register makes the stored digital temperature data immediately available to control circuit 54, and thereby reduces the time required for control circuit 54 to obtain and evaluate that temperature data.

Reading step 108 includes selecting $V_{DIGITAL}$ signal 36 to issue as an output signal of IC 22, such as D_OUT signal 60 that issues from multiplexer 20 in response to command signal 50. Reading step 108 further includes the reading of the temperature data in the form of D_OUT signal 60 by controller chip 54, such as, for example a dedicated memory access controller or microprocessor. Once $V_{DIGITAL}$ signal 36 is read by controller 54, the value of the temperature of die 24 corresponding to $V_{DIGITAL}$ signal 36 is determined, and comparing step 110 is executed.

Comparing step 110 compares the temperature of die 24 to predetermined threshold values. More particularly, comparing step 110 as executed by control circuit 54 compares the temperature of die 24 with a first or minimum threshold. If the temperature of die 24 is less than this first or minimum, control circuit 54 increases the frequency with which IC 22 is accessed. If compare step 110 determines that the temperature of die 24 is above a second or maximum threshold, which could be the same as or different from the first/minimum threshold, control circuit 54 executing adjusting step 112 decreases the frequency with which IC 22 is accessed until the temperature of die 24 as determined by comparing step 110 drops below a third or operating threshold, which may be the same as or different than the second/maximum threshold but is typically greater than the first and less than the second thresholds. If compare step 110 determines that the temperature of die 24 is between the third/operating and the second/maximum thresholds, control circuit 54 executing adjusting step 112 leaves unchanged the frequency with which IC 22 is being accessed. The frequency with which IC 22 is accessed may also subject to certain predetermined absolute maximum and minimum ratings which method 100 and TTD 10 are precluded from exceeding by, for example, control circuit 54.

In the embodiment shown, HAND signal 46 is issued by ADC 14 indicating that the conversion of $V_{ANALOG}$ signal 30 to $V_{DIGITAL}$ signal 36 is complete. However, it is to be understood that the present invention can be alternately configured, such as, for example, with a clock divider or other source for HAND signal 46.

In the embodiment shown, the ADC, clock divider, register and multiplexer are integral and monolithic with the integrated circuit die. However, it is to be understood that the present invention can be alternately configured, such as, for example, with one or more of the aforementioned components being formed separately from the integrated circuit die.

In the embodiment shown, control circuit 54 is configured as an external, off-chip controller that controls the frequency with which IC 22 is accessed dependent at least in part upon the temperature of die 24. However, it is to be understood that the present invention can be alternately configured, such as, for example, with a control circuit that is integrally formed with IC 10, i.e., on die 24. Forming control circuit 52 integrally with IC 10 and/or on die 24 enables IC 10 to independently control the frequency with which it is accessed and thereby reduce power consumption.

In the embodiment shown, TSC 12 includes temperature sensitive element (TSE) 32, which is configured as a resistor, and current source 34. However, it is to be understood that the present invention can be alternately configured, such as, for example, with a temperature sensitive circuit having a different type of temperature sensitive element, such as, for example, a capacitor, transistor or other temperature sensitive component.

While this invention has been described as having a preferred design, the present invention can be further modified within the spirit and scope of this disclosure. This application is therefore intended to cover any variations, uses, or adaptations of the present invention using the general principles disclosed herein. Further, this application is intended to cover such departures from the present disclosure as come within the known or customary practice in the art to which this invention pertains and which fall within the limits of the appended claims.

What is claimed:

1. An integrated circuit formed on a die, said integrated circuit comprising:

a temperature sensitive circuit (TSC) sensing and issuing an electrical signal indicative of a temperature of the die, said TSC including a temperature sensitive element integral and monolithic with said die;

an analog to digital converter (ADC) electrically connected to said TSC and receiving said electrical signal, said ADC issuing a digital signal dependent at least in part upon said electrical signal and being indicative of the temperature of the die;

a register electrically connected to said ADC, said register receiving and storing said digital signal; and a multiplexer electrically connected to said register and receiving said digital signal therefrom, said multiplexer receiving a normal read data signal and a command signal, said multiplexer issuing a data out signal dependent at least in part upon said command signal, said data out signal being one of said digital signal and said normal read data signal.

2. The integrated circuit of claim 1, further comprising an enable signal issuing circuit electrically connected and issuing a periodic enable signal to said ADC, said ADC issuing said digital signal when said enable signal is active.

3. The integrated circuit of claim 2, wherein said multiplexer is configured for being electrically connected to a control circuit, the control circuit being configured for reading said data out signal, the control circuit configured for increasing a frequency with which said IC is accessed when said data out signal indicates a temperature of said die is less than a first predetermined threshold.

4. The integrated circuit of claim 3, wherein the control circuit is further configured for decreasing a frequency with which said IC is accessed when said data out signal indicates a temperature of said die exceeds a second predetermined threshold.

5. The integrated circuit of claim 4, wherein said control circuit is further configured for leaving unchanged a frequency with which said IC is accessed when said data out signal indicates a temperature of said die is between said second predetermined threshold and a third predetermined threshold.

6. The integrated circuit of claim 2, further comprising a control circuit electrically connected to said multiplexer, said control circuit reading said data out signal, said control circuit increasing a frequency with which said IC is accessed when said data out signal indicates a temperature of said die is less than a first predetermined threshold.

7. The integrated circuit of claim 6, wherein said control circuit is integral and monolithic with said die.

8. A method of throttling the frequency with which an integrated circuit is accessed, comprising:

sensing the temperature of the integrated circuit die;

converting the sensed temperature to a digital signal indicative of the die temperature;

storing the digital signal in a register of the integrated circuit;

reading the digital signal; and adjusting the frequency with which the integrated circuit is accessed dependent at least in part upon the temperature of the die as indicated by the digital signal;

wherein said reading step comprises:

supplying the digital signal and a normal read data signal to a multiplexer; and issuing a command signal to said multiplexer to thereby select the digital signal as an output signal of the multiplexer, a control circuit reading said output signal of the multiplexer.

9. The method of claim 8, wherein said sensing step comprises transforming with a temperature sensitive element the temperature of the integrated circuit die to an analog electrical signal, the temperature sensitive element being integrally and monolithically formed on the die of the integrated circuit, a supply element that is substantially insensitive to changes in temperature being electrically connected to said temperature sensitive element such that a change in die temperature results in a corresponding change in one of a voltage drop across and a current flow through the temperature sensitive element.

10. The method of claim 9, wherein said temperature sensitive element is a resistor and the supply element is a constant current source.

11. The method of claim 9, wherein said converting step comprises converting with an analog-to-digital converter the analog electric signal to a digital electrical signal.

12. The method of claim 9, wherein said converting step is periodically enabled by an enable signal.

13. The method of claim 12, wherein the enable signal is issued by a clock divider receiving and dividing by a predetermined factor a system clock.

14. The method of claim 12, wherein said enable signal is dependent at least in part upon the thermal reaction time of the integrated circuit die.

15. The method of claim 9, wherein said storing step comprises:
issuing a handshake signal to the register, the handshake signal indicating the completion of the converting step; and
storing in the register the digital signal in response to the handshake signal.

16. The method of claim 9, wherein said adjusting step comprises increasing the frequency with which the IC is accessed when the digital signal indicates the die temperature is less than a first predetermined threshold.

17. The integrated circuit of claim 16, wherein said adjusting step further comprises decreasing the frequency with which the IC is accessed when said digital signal indicates the die temperature exceeds a second predetermined threshold.

18. The integrated circuit of claim 16, wherein said adjusting step further comprises leaving the frequency with which the IC is accessed unchanged when the digital signal indicates the die temperature is between the second predetermined threshold and a third predetermined threshold.

19. A method of throttling the frequency with which an integrated circuit is accessed, comprising:
sensing the temperature of the integrated circuit die;
converting the sensed temperature to a digital signal indicative of the die temperature;
storing the digital signal in a register of the integrated circuit;
reading the stored digital signal;
adjusting the frequency with which the integrated circuit is accessed dependent at least in part upon the temperature of the die as indicated by the digital signal;
wherein said sensing step comprises transforming with a temperature sensitive element the temperature of the integrated circuit die to an analog electrical signal, the temperature sensitive element being integrally and monolithically formed on the die of the integrated circuit, a supply element that is substantially insensitive to changes in temperature being electrically connected to said temperature sensitive element such that a change in die temperature results in a corresponding change in one of a voltage drop across and a current flow through the temperature sensitive element; and
wherein said temperature sensitive element is a resistor and the supply element is a constant current source.

20. A method of throttling the frequency with which an integrated circuit is accessed, comprising:
sensing the temperature of the integrated circuit die;
converting the sensed temperature to a digital signal indicative of the die temperature;
storing the digital signal in a register of the integrated circuit;
reading the stored digital signal;
adjusting the frequency with which the integrated circuit is accessed dependent at least in part upon the temperature of the die as indicated by the digital signal;
wherein said sensing step comprises transforming with a temperature sensitive element the temperature of the integrated circuit die to an analog electrical signal, the temperature sensitive element being integrally and monolithically formed on the die of the integrated circuit, a supply element that is substantially insensitive to changes in temperature being electrically connected to said temperature sensitive element such that a change in die temperature results in a corresponding change in one of a voltage drop across and a current flow through the temperature sensitive element;
wherein said converting step is periodically enabled by an enable signal; and
wherein said enable signal is issued by a clock divider receiving and dividing by a predetermined factor a system clock.

21. A method of throttling the frequency with which an integrated circuit is accessed, comprising:
sensing the temperature of the integrated circuit die;
converting the sensed temperature to a digital signal indicative of the die temperature;
storing the digital signal in a register of the integrated circuit;
reading the stored digital signal;
adjusting the frequency with which the integrated circuit is accessed dependent at least in part upon the temperature of the die as indicated by the digital signal;
wherein said sensing step comprises transforming with a temperature sensitive element the temperature of the integrated circuit die to an analog electrical signal, the temperature sensitive element being integrally and monolithically formed on the die of the integrated circuit, a supply element that is substantially insensitive to changes in temperature being electrically connected to said temperature sensitive element such that a change in die temperature results in a corresponding change in one of a voltage drop across and a current flow through the temperature sensitive element; and
wherein said converting step is periodically enabled by an enable signal; and
wherein said enable signal is dependent at least in part upon the thermal reaction time of the integrated circuit die.

* * * * *